United States Patent [19]

Nakada et al.

[11] 4,251,414
[45] Feb. 17, 1981

[54] CATHODIC SEDIMENT TYPE OF ELECTRODEPOSITION PAINT POSITION

[75] Inventors: Hisao Nakada; Michisuke Harada; Yukio Yamase; Ryuji Matsui, all of Ichihara, Japan

[73] Assignee: Nippon Soda Company, Ltd., Tokyo, Japan

[21] Appl. No.: 48,145

[22] Filed: Jun. 13, 1979

[51] Int. Cl.$^3$ .................... C08L 63/00; C08L 63/08
[52] U.S. Cl. .................... 260/297 NR; 260/29.2 EP; 260/29.2 TN; 525/109; 525/111; 525/113; 525/526; 525/911; 525/913; 528/103; 204/181 R
[58] Field of Search ............... 525/113, 111, 526, 911, 525/913; 260/29.7 NR, 29.2 EP; 528/103

[56] References Cited

U.S. PATENT DOCUMENTS

| | | | |
|---|---|---|---|
| 3,449,281 | 6/1969 | Sullivan | 525/526 |
| 3,869,366 | 3/1975 | Suzuki | 525/526 |
| 3,960,795 | 6/1976 | Dowbenko | 525/111 |
| 4,130,546 | 12/1978 | Goto | 525/111 |
| 4,139,396 | 2/1979 | Otsuki | 260/29.2 EP |
| 4,172,062 | 10/1979 | Sekmakas | 525/113 |

*Primary Examiner*—Paul Lieberman
*Attorney, Agent, or Firm*—George B. Oujevolk

[57] ABSTRACT

A cathodic sediment type of electrodeposition paint composition which consists of an aqueous medium, a resinous binder dissolved or dispersed therein and an accelerating catalyst. The resinous binder is an acid neutralized reaction mixture of a first and a second component in a weight ratio of 99 to 20 parts of the first component to 1 to 80 parts of the second component. The first component is an addition material of a polybutadiene terminating in an epoxy group and a primary or secondary amino compound. The second component is an addition material of an epoxy resin and a primary or secondary amino compound. The accelerating catalyst is selected from the group consisting of an oleosoluble organic acid salt of a transition metal, the metal in turn being selected from the group consisting of iron, manganese, vanadium and titanium.

17 Claims, No Drawings

CATHODIC SEDIMENT TYPE OF ELECTRODEPOSITION PAINT POSITION

DETAILED DESCRIPTION OF THE INVENTION

Background of the Invention

The present invention relates to a paint composition having aqueous solubility or aqueous dispersibility and more particularly, it relates to the paint composition which comprises using an objective coating product as a cathode and thereby performing suitably an electrodepositing coating step.

Brief Description of the Prior Art

In recent years, the electrodepositing coating process has been remarkably developed as an industrial coating method. The paints and the coating process used in this field are multifariously varied. As a main electrodepositing coating resin(s) used hitherto, a resin having a carboxyl group which involves for example a maleate oil, a maleate polybutadiene, maleate epoxy ester and an alkyd resin or an acryl resin containing acrylic acid or methacrylic acid as a component of its polymer may be cited. Those resins are aqueously solubilized by neutralizing them with a base such as ammonia, organic amine or potassium hydroxide and thereby an anodic sediment type of electrodepositing coating process has been practically performed by using the objective corting product as the anode.

But, according to the anodic sediment type of electrodepositing coating process, the objective coating metal product is used as the anode and the oxygen is generated with an electrolysis of the water and thereby, the objective metal product is oxidized with the said oxygen and a phenomenon such as a dissolution of one part of the oxidized metal is caused.

Usually, the objective coating metal product is preliminarily treated with phosphate salt(s) for the sake of improving its anticorrosive nature and in this occasion, the mentioned phenomenon occurs similarly and consequently, according to the said anodic sediment type of electrodepositing coating process, the anticorrosive property regarded as the most important property, out of practical properties of coated film is deteriorated. This is one drawbalk.

On the other and, according to the cathodic sediment type of electrodepositing coating process, the objective coating metal product is used as the cathode and dissolution of the metal oxide from the objective metal product or the dissolution from the preliminarily treated layer can be prevented. Consequently, it can be expected to improve the foregoing drawbacks which occur in the anodic sediment type of electrodepositing process.

Heretofore, various proposals have been submitted for the cathodic sediment type of electrodepositing coating resins. But, those prior techniques did not attain in satisfactary level in respect to various paints of important features of the electrodepositing paint material, in other words, as to a film curing effect, a smoothness of coated surface, a bath stability, a pigment dispersibility and throwing power or the like.

OBJECT OF THE INVENTION

An object for the present invention is to correct the foregoing drawbacks and to a a cathodic sediment type of electrodepositing paint composition having a superior practical coating property, as to the film curing effect, the smoothness of coated surface, the film flexibility or the film adhesive fixing nature as a film physical property and the anticorrositive effect and the anti-alkalinity as a film chemical property and the bath stability, the pigment dispersibility and the throwing power.

SUMMARY OF THE INVENTION

In other words, the present invention relates to a cathodic sedimentation type of electrodeposition paint composition which comprises:

(I) an addition material consisting of a butadiene homopolymer or copolymer having an epoxy group at the polymer chain terminal or a polymer chain intramolecular part (hereinafter this is called a butadiene polymer having an epoxy group) and a basic amino compound (hereafter this is called the first component or component [I];

(II) a partial addition material consisting of an epoxy resin or a modified epoxy resin further described herein and a basic amino compound (hereinafter, this is called component [II]); further and advantageously with (III) a block isocyanate compound (hereinafter called component [III]); and/or (IV) a curing accelerating catalyst (hereinafter called component [IV]).

DETAILED DESCRIPTION

The first feature of the present invention is to raise the curing nature of the coated film in comparison with that of other cathodic sedimentation type of electrodeposition paint compositions produced by conventional techniques. The first feature for raising the film curing effect is accomplished with a curing process which comprises using the epoxy resin as a main component, i.e., by introducing the butadiene polymer having an epoxy group as a main constituent into the paint composition and further using a block isocyanate compound in the combination thereof.

According to a conventional technical conception, an oxidizing, crosslinking type of curing reaction for the compound(s) having unsaturated bond(s) such as a natural drying oil or the butadiene polymer is accompained with a phenomenon of oxidzing hindrance in the presence of the basic amino compound as used in the present invention. So, it has been common sense that the oxidzing crosslinking type of curing reaction has been maintained on a level which is impossible in practice when carried out on an industrial scale. But, according to the present invention, it is improved to an ordinary possible level selectively using a special catalyst and thereby, its curing effect is conspicuously improved in comparison with a conventional crosslinking curing effect of the coated film by the epoxy resin with the block isocyanate. Furthermore, the varous film properties involving the anticorrosive effect, the smoothness of the coated surface, the film flexibility and film adhesiveness and the practical coating capabilities involving the pigment dispersibility, the bath stability and the throwing power are improved with superior effects. Those paints can be cited out as a conspicuous feature.

The butadiene polymer having an epoxy group, employable as the component [I] by the present invention involves the component [I]-(A), the component [I]-(B) and the component [I]-(c) as follows:

The component [I]-(A): is a butadiene homopolymer having an epoxy group at the terminal of the polymer chain or a butadiene copolymer consisting of 30 to 100 weight percent of butadiene as a constituent of the polymer chain and 70 to zero weight percent of α-methylstyrene or styrene.

The component [I]-(B): is a derivative of a butadiene polymer having an epoxy group at the terminal part or the intramolecular part of the polymer chain which is obtained by treating the polymer, i.e., the component [I]-(A) with an organic peroxide.

The component [I]-(C): is a butadiene polymer having an epoxy group at the intramolecular part of polymer chain which is produced by treating a butadiene homopolymer or copolymer obtained by a common polymerization process with an organic peroxide.

Out of foregoing components [I]-A through [I]-(c), the butadiene polymer having the epoxy group at the terminal of polymer chain, i.e., the component [I]-(A) is particularly desirable.

As to the process for producing the butadiene polymer having an epoxy group(s), various processes are considered. As a general practical process, a process for producing the component [I]-(A) is carried out in such manner that a butadiene monomer alone or a mixture of the butadiene monomer and other copolymerizable monomer(s), e.g. styrene and/or methyl styrene is polymerized/copolymerized in the presence of an alkali metal catalyst, e.g. sodium or lithium at a low temperature with a living anion polymerization step and thereby, an intermediate reaction compound, i.e. a living polymer is obtained and further, it is treated with a halogenated alkylene oxide represented by a general formula: for example epichlorohydrin and thereby, the

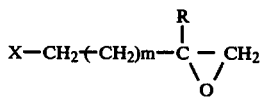

epoxy group is introduced in the terminal of the polymer chain of the living polymer, wherein X denotes a halogen atom, m is integer more than zero and R is hydrogen atom or alkyl group having 1 to 4 carbon atom(s). Further, a process for producing the component [I]-(B) is carried out in such a manner that the butadiene polymer i.e. component [I]-(A) is treated in a secondary treatment using an organic peroxide(s) such as peracetic acid or performic acid. Furthermore a process for producing component [I]-(C) is carried out in such manner that the butadiene homopolymer or copolymer is obtained by reacting the said intermediate reaction compound, i.e. the living polymer with a compound having an active hydrogen atom, for example hydrogen or methanol, or a butadiene polymer obtained with a conventional process such as a radical polymerization process or a coordination anion polymerization process is treated with an organic peroxide(s) such as peracetic acid or performic acid and thus, component [I]-(c) at the epoxy group having the intramolecular part of polymer chain is obtained.

As to the process for producing the butadiene polymer having the epoxy group by a practical example of the present invention, a process for producing the butadiene polymer having the epoxy group at the terminal of polymer chain, i.e. the component [I]-(A) is set forth as follows:

The butadiene is gradually added in a dispersion system consisting of a Lewis base type of solvent such as tetrahydrofuran and dispersed alkali metal(s) such as sodium or lithium are reacted in the presence of an aromatic hydrocarbon activator such as naphthalene or 1.2-diphenylbenzene at a constant low temperature of −20° C. or less, for example, −60° C. of temperature and thereby an intermediate reaction compound containing butadiene homopolymer is obtained. Further, a mixture of butadiene and styrene or a-methylstyrene is gradually added in above mentioned dispersion system with same reaction condition and thereby an intermediate reaction compound containing butadiene copolymer is obtained.

The intermediate reaction compound containing the butadiene homopolymer or copolymer is treated with a halogenated alkylene oxide represented by the general formula:

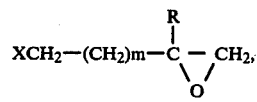

for example, epichlorohydrin and then, it is treated with water or methanol and thus, component [I]-(A) is obtained. In foregoing general formula, X denotes a halogen atom, m is an integer more than zero and R denotes a hydrogen atom or an alkyl group having 1 to 4 carbon atoms.

The foregoing butadiene polymer having the epoxy group of a number average molecular weight in a range of 300 to 10,000 can be used. If it has a molecular weight of 300 or less, its film forming nature is not satisfactory, and further, of it has a molecular weight of 10,000 or more, the workability in the course of a modification or degradation reaction step, i.e., in a step hereinafter described is not sufficient. The content of the epoxy group in the butadiene polymer is appropriately selected in excess of the amount sufficient which is required for a bonding reaction of the amino compound with a requisite aqueous solubility characteristic step.

The butadiene polymer having the epoxy group which contains a functional group, for example, a hydroxyl group, an ester group or a ketone group in the polymer chain, in addition to the said epoxy group can be used for the present invention.

As the amino compound constituent in the structure of component [I], a compound containing a primary amino group or a secondary amino group may be used. For example, a mono-or di-alkylamine(s) involving propylamine, butyl amine, diethyl amine or dipropylamine; an alkanol amine(s), involving ethanol amine, diethanol amine or dipropanol amine; a mono-or polyalkylene polyamine(s) involving ethylene diamine, propylene diamine, hexamethylene diamine, diethylene triamine or triethylene tetramine and further N-amino ethanol amine and diethyl aminopropyl amine are cited.

Those amino compounds are selected in a sufficiant amount that the amine component of the final reaction compound may not impair its aqueous solubility and its electrophoresis capabilities. The amino compound as an individual compound or its mixture is used by selecting its the amount used in a range of equal mol or less in proportion to the content rate of the epoxy group.

The addition reaction of the butadiene polymer having the epoxy group with the amino compound is carried out in a temperature range of 50° C. to 150° C. This addition reaction is performed in the presence of a diluting solvent or in the absence thereof, but in order to make the said reaction proceed smoothly, the solvent is advantageously used. The solvent or solvents are preferably inactive to the butadiene polymer and the amino compound and further it has preferably an aqueous solubility.

For example, ethylene glycol monoethyl ether (hereinafter, this is called as cellosolve), ethylene glycol monobutyl ether (hereinafter, this is called as butyl cellosolve), ethyleneglycol monoethyl ether acetate (hereinafter, this is called as cellosolve acetate), diacetone alcohol, dioxane and cyclohexanon or the like may be cited and the amount used is selected at an amount of 50 weight percent or less in proportion to a pure component of the used reactants.

The epoxy resin used is a compound having two or more of epoxy groups in one molecule, except the polybutadiene type of epoxy resin.

The desirable epoxy resin hereinbefore mentioned involves a bisphenol type of epoxy resin and novolak type of epoxy resin. The expression bisphenol type of epoxy resin means an epoxy resin which is obtained from bisphenol A or hydrogenated bisphenol A and epichloro hydrin and the typical bisphenol type epoxy resin is set forth with the molecular formula as follow:

wherein n is an integer ranging from zero to 12.

The said novolak type of epoxy resin means novolak glycidyl ether prepared from a condensate of phenol or phenol having substituent at its nucleus position and formaldehyde and the typical novolak epoxy resin is set forth with the molecular formula as follows:

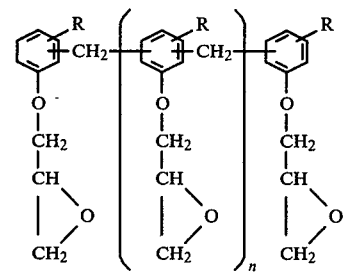

wherein n is an integer ranging from zero to 12 and R is a hydrogen atom, alkyl group having 1 to 4 carbon atoms or alkoxy group.

Besides the foregoing epoxy resins, a polyglycidyl ether prepared of a condensate of polyhydric alcohol (e.g. ethylene glycol, glycerine or trimethylolpropane) and epichlorohydrin, a polyglycidyl ester prepared of a condensate of polycarboxylic acid (e.g. adipic acid or phthalic acid) and epichlorohydrin, triglycidylisocyanurate and compounds which are obtained by epoxidizing unsaturated double bond(s) of unsaturated

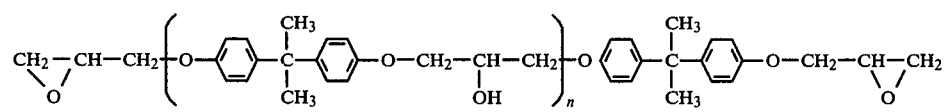

wherein n is an integer ranging from zero to 12. Further, it is also denoted with the molecular formula follows:

oils or alicyclic olefine(s) may be used. Typical examples for above mentioned compounds are set forth with the molecular formulae as follows:

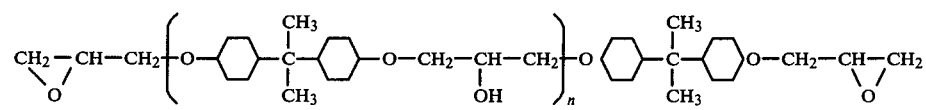

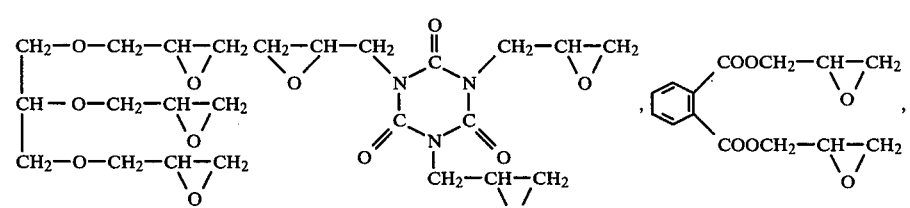

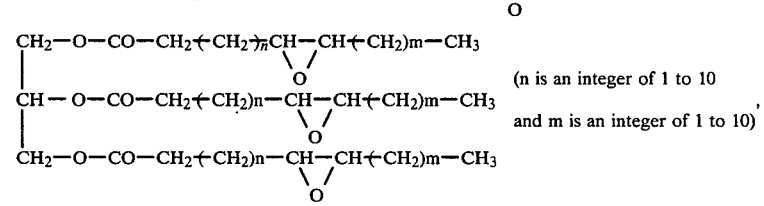

(n is an integer of 1 to 10 and m is an integer of 1 to 10)

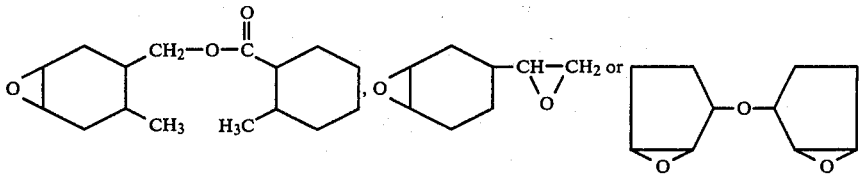

The denatured epoxy resin employable for the present invention is a resin material obtained by a process comprising making the epoxy resin react with a cresol or novolak type of resin or bisphenol A and an alkylene oxide having 1 to 4 carbon atoms with an addition reaction step. Particularly, a partial addition reaction compound of the bisphenol type of epoxy resin with a cresol type of phenol resin is advantageously used for the denatured epoxy resin.

The amount of the denaturing agent employed for producing the denatured epoxy resin is appropriately selected in a range of from zero to 50 weight percent in proportion to the epoxy resin and usually, the addition reaction is carried out at a temperature of 60° C. to 160° C.

As the amino compound used for the partial addition reaction step with the epoxy resin(s) or the denatured epoxy resin, an amino compound containing a primary amino group or a secondary amino group is used as described in the explanation item of the component [I].

Out of foregoing amino compounds, the secondary alkyl-or alkanolamine(s) involving diethyl amine or diethanol amine are particularly desirable.

In carrying the present invention into practice, the component [I] and the component [II] are preferably used in a chemical bonded from a viewpoint of vehicle homogeneity. This chemical bonding form can be practised with a procedure in which one part of the amino group(s) in the component [I] is bonded with an epoxy residue remaining in component [II]. Consequently, in the event of carrying out the partial addition reaction, an the amount of the amino compound employed is controlled to the extent of one equivalent unit or less in proportion to the epoxy group in the epoxy resin or the denatured epoxy resin. Further, in the event of finishing the partial addition reaction, a satisfactory amount of the epoxy group is required to remain for use in the bonding reaction of component [I] with component [II].

Practically, the partial addition reaction step is carried out at a temperature of 50° C. to 120° C. by using an amino compound having 50 to 95 percent of amine equivalent in proportion to the equivalent of epoxy group in the presence of an aqueous soluble solvent e.g. cellosolve, butyl cellosolve, cellosolve acetate or diacetone alcohol.

If the amine equivalent is in the extent of 95 percent or more, its chemical bond is not satisfactorily carried out in the reaction of component [I] with component [II] and further, its stability deteriorates in the separation step, aqueous solubility of the resin is affected and thus has undesirable effects.

If the amine equivalent is 50 percent or less, there is a danger of greatly increasing its viscosity which is brought about in the bonding reaction of component [I] with component [II].

The block isocyanate compound (component [III]) used as an additive in component [I] and the component [II] in the present invention is appropriately chosen from a perfect or partial block compound which is treated so as to have a molar ratio of NCO/OH in a range of 2.0/2.0/to 2.0/1.0.

A polyisocyanate employable as the raw material is an aromatic or aliphatic diisocyanate such as m-or p-phenylene-diisocyanate, 4.4'-diphenyl methane-diisocyanate, 2.4- or 2.6-tolylene diisocyanate and hexamethylene-diisocyanate or the like.

Further it comprises an addition compound of the said aromatic or aliphatic diisocyanate with a polyol, e.g. ethylene glycol, propylene glycol or trimethylol propane.

As the blocking agent to the polyisocyanate, a lower molecular active hydride compound is used. For example, an aliphatic or aromatic monohydric alcohol involving methanol, ethanol, butanol, hexanol, cyclohexanol, benzyl alcohol, cellosolve, butyl cellosolve or the like and a hydroxy-tertiary amine such as dimethyl-amino ethanol and phenol, cresol or e-caprolactam are cited.

The foregoing polyisocyanate compounds are selected from a viewpoint of their chemical features that as a typical chemical feature, they may have a thermal dissociation nature as well as a mutual compatible solubility to the component [I] and the component [II], i.e. necessary components of the resin composition by the present invention.

Out of above mentioned polyisocyanate compounds, 2.4- or 2.6-tolylenediisocyanate and hexamethylenediisocyanate are cited as favourable examples. Further as the blocking agent, an aliphatic monohydric alcohol involving butanol and hexanol and e-caprolactam are exemplified as a good example.

The said block isocyanate compound can be obtained with a process which comprises making the polyisocyanate compound to react with the blocking agent by an amount of one equivalent part or less proportional to the content rate of the isocyanate group in the polyisocyanate compound. This reaction is an exothermal reaction, so that it is easily carried out at a temperature of 80° C. or less in the presence of a solvent inactive to the isocyanate group, for example, cellosolve acetate, acetate esters, cyclohexanone or diethylketone by means of dropping the blocking agent into the polyisocyanate component.

The catalyst for accelerating the curing step as an additive to the component [I] and the component [II] in the present invention comprises an accelerating catalyst for dissociating a urethane bond and another accelerating catalyst for oxidizing and curing an unsaturated bond in the butadiene polymer having the epoxy group.

As the former catalyst example, a tin compound involving tin acetate and dibutyl-tin-dilaurate is mentioned and the amount used is chosen as a rate of 3 weight percent or less in proportion to the total resin components.

As the latter catalyst example, an oleo-soluble, organic metal salts, acetate salt of various metals and phosphate salts are cited out. Of above latter catalyst, naphthenate salts and octynoate salts of transition metals involving iron, manganese, vanadium and titanium and these mixtures are particularly effective and the appropriate amount to use is chosen in a total range of 0.005 to 0.0 weight percent, preferably in a range of 0.01 to 1.0 weight percent in proportion to the total resin components. Even if the amino group which causes a phenomenon of hidering the oxidizing and curing effect to the unsaturated bond is present a reaction system, the favourable film curing nature can be obtained by using the catalysts. In practice, the object of the present invention can be attained by using the accelerating catalyst of oxidizing, curing the unsaturated bond alone but it is preferably used in the combination with the accelerating catalyst for dissociating the urethane bond.

An appropriate practical mode for producing the cathodic sedimenting type of elecrodepositting paint composition by the present invention from the component [I] and the component [II] is carried out by the following process:

In other words, reaction product (A) is obtained by bonding chemically the component [I] and made to react with the residual epoxy group in component [II].

Then, a reaction product (B) is obtained by mixing the reaction product (A) with the component [III] or by bonding chemically the reaction product (A) with the component [III]. This latter chemical bonding reaction is achieved by making the hydroxyl group in the reaction product (A) react with the residual isocyante group in the component [III], but if the reaction product (A) contains a primary amino group, the reaction product (A) is first treated as a ketone by a conventional method and the reaction product (A) is protected with a ketoamino substituting step and then, the said latter chemical bonding reaction is carried out for the protected reaction product (A) and the component [III]. This procedure is desirable.

Furthermore, the reaction product (B) is mixed with the component (IV), preferably in the presence of an aqueous soluble, organic solvent and the resulting mixture is neutralized with an organic acid or an inorganic acid and a necessary pigment(s) is blended with and dispersed in it and the resulting mixture is diluted with a deionized water to a specified concentration and thus, the objective paint composition is obtained.

In foregoing practical mode, an optional combination fo the reaction product (A) with the component [III] and the component [IV] can be used. For example, the combination of the reaction product (A) and the component [III], without component (IV) or without component [III] can be practically used.

A blending ratio of the component [I] to the component [II] for producing the reaction product (A) is chosen as an optional ratio. In order to attain sufficiently the effect of the present invention, the component [I] is preferably chosen in a range of 99 to 20 weight percent (The expression "weight percent" denotes a rate of pure component and it will have the same significance hereinafter) and the component [II] is selected in a range of 1 to 80 weight percent. In a step of combining the reaction product (A) with the component [III], a ratio of the latter proportional to the former is suitably chosen as a rate of 50 weight percent or less. Further, in a step of combining the component [IV] with the reaction product (A) or the reaction product (B), the weight ratio of 5 weight percent or less is used.

In the above mentioned neutralizing and aquoussolubilizing steps, an aqueous soluble organic solvent(s) is perferably used for the porpose of raising its aqueous dispersibility and improving its coated film properties and the said organic solvent(s) comprises, for example, isopropanol, tert-butanol, cellosolve, butyl cellsolve, cellosolveacetate, methyl ethyl-ketone or diacetone alcohol alone or these mixtures and its using amount is appropriately selected as a total rate of 50 weight percent or less in proportion to a pure component of the resin.

As the acid employable for the neutralizing step, an organic acid(s) involving formic acid, acetic acid, hydroxy-acetic acid, propionic acid, butyric acid and lactic acid or an inorganic acid(s) involving phosphoric acid, sulfuric acid and hydrochloric acid may be used. The amount used is more than the necessary amount which is able to feed an aqueous solubilizing nature or an aqueous dispersibility to the resin and further, the the amount used is perferably chosed below the equivalent of the amino group in the resin composition.

The resin composition by the present invention may be used as a clear paint and usually, it is used as an enamelled paint by adding pigment(s) in it. As the pigment(s), common kinds of pigments used for the electrodeposition paint are used. A pigment which has reactivity with the acid(s) and acts as a neutralizing agent is not desirable.

A coloring pigment and an extender pigment in an optional amount, involving red oxide, titanium white, carbon black, talc and clay or the like can be used and its using amount is desirably chosen as an extent of one equivalent or less proportional to the pure component of the resin.

A cationic or nonionic resin(s) having aqueous solubility or aqueous dispersibility, as a vehicle component may be added in the paint composition by the present invention, in so far as it may not hinder the object of the present invention.

As a practical example of the cationic or nonionic resin, an acryl polymer(s) containing aminogroup, such as polyacryl-azide, a resin of methylol-melamine and a resin of methylol-phenol may be used in the present invention.

For the purpose of giving those skilled in the art a better understanding of the invention, the following illustrative examples are given: Further, "Part" and "percent"(%) in those Examples mean respectively a weight part and a weight percent.

EXAMPLE 1

A sodium dispersed material was added in tetrahydrofuran containing dissolved 1.2-diphenylbenzene and butadiene was added in the system kept at $-60°$ C. of temperature and thereby, an intermediate compound of living polymerization reaction was obtained.

Then, the intermediate compound was treated with epichlorohydrin and a butadiene homopolymer having 1,050 of number average molecular weight, 2.4 percent of epoxy oxygen content rate and a epoxy group at the terminal of the polymer chain and consisting of 90.5 percent of 1,2- bond and 9.5 percent of 1,4-trans bond was obtained.

Further, a mixture consisting of 1,000 parts of said butadiene homopolymer, 110 parts of diethylamine and 278 parts of cellosolve acetate was heated at 60° C. of temperature for one hour and then, the mixture was maintained at 100° C. of temperature during 3 hours and thus, an addition reaction compound of polybutadiene-amine having an amine number of 60 (1-A) was obtained.

On the other hand, a liquid mixture consisting of 568 parts of Epikote-828 (i.e., an epoxy resin by a condensate of phisphenol A and epichlorohydrin, a Trade Name for product of Shell Chemical Co.) and 184 parts of methyl ethyl ketone was kept at 60° C. of temperature and 172 parts of diethyl amine was gradually added in the liquid mixture and then, it was kept at 60° C. o temperature during 0.5 hour and a partial addition reaction compound of epoxy resin-amine having an amine number of 160 (1-B) was obtained.

Further, 484 parts of tolulene diisocyanate (as a mixture of 80 percent 2.4-TDI and 20 percent of 2.6-TDI) was blended with 198 parts of butyl acetate. The resulting liquid mixture was kept at 60° C. temperature and 308 parts of n-butanol was gradually dropped in the said liquid mixture and this mixture was kept at 60° C. of temperature during one hour. Thus, the partial block isocyanate compound (1-C) was obtained.

1,388 parts of the addition reaction compound of polybutadiene-amine (1-A) heretofore obtained was mixed with 924 parts of the partial addition reaction compound of epoxy resin-amine (1-B) and the resulting mixture was kept at 60° C. temperature for one hour. Then, 990 parts of the partial block isocyanate compound (1-C) was added in the mixture and the resulting mixture was kept at 60° C. of temperature for one hour. Thus, the resin composition by the present invention (1-D) having an amine number of 70 and 80 percent of N.V. was obtained.

125 parts of the said resin composition (1-D) was neutralized by adding 20 weight parts of butyl cellosolve and 5.5 parts of acetic acid. Then, 1.0 parts of iron naphthenate having 5 percent of concentrate and 2.0 parts of dibutyl-tin-dilaurate was added with sufficient mixing procedure and further, 850 parts of deionized water was added. Thus, an aqueous homogeneous dispersion solution having about 10 percent of N.V. and 5.8 of pH was obtained. The aqueous dispersion solution was used as an electrodeposition sample and a steel plate treated with zinc phosphate was used as a cathode and the electrodeposition procedure was carried out at a temperature of 30° C. during 2 minutes with 150 V of voltage. After its baking step at 170° C. of temperature during 30 minutes, a cured film having 22µ of thickness and a superior smoothness by 3H pencil hardness was obtained. Properties of the said film are set forth as follows:

| | |
|---|---|
| Impact resistance (⅛ inch × 1.0 kg × 50 cm) | : Admitted |
| Erichsen resistance | : more than 70 mm |
| Salt spray test in accordance with JIS (Japanese Industrial standard)-Z-2371 | : None-corroded in 750 hours |

EXAMPLE 2

The butadiene homopolymer having 1,450 of number average molecular weight, 1.7 percent of an epoxy oxygen content rate and epoxy group at the terminal of the polymer chain, consisting of 89.5 percent of 1,2-bond and 10.5 percent of 1.4-trans bond was prepared with the same process in Example 1. 1,000 parts of the said butadiene homopolymer was mixed with 60.5 parts of ethylenediamine and 265 parts of butyl cellosolve and the resulting mixture was kept at a temperature of 80° C.

for one hour and then at a temperature of 120° C. for two hours. Thus, the addition reaction compound of polybutadiene-amine (2-A) having a 95% amine number was obtained.

On the other hand, 609 parts of Epikote 834 (Trade Name for a product of the Shell Chemical Co.,), i.e. an epoxy resin by condensate of bisphenol A-epichlorohydrin was mixed with 175 parts of methyl isobutyl ketone and the resulting liquid mixture was kept at 60° C. of temperature and 91 parts of diethylamine was gradually dropped in it. Then, the liquid mixture was kept at a temperature of 60° C. for 30 minutes and thus, the partial addition reaction compound of epoxy resin-amine (2-B) having 90 of amine number was obtained.

1,325 parts of the addition reaction compound of polybutadiene-amine (2-A) heretofore obtained was mixed with 875 parts of the partial addition reaction compound of epoxy resin-amine (2-B) and the resulting mixture was kept at a temperature of 60° C. for one hour. Then, 550 parts of the same partial block isocyanate compound (1-C) used in the Example 1 was added to the mixture and kept at 60° C. for one hour and thus the resin composition of the present invention (2-C) having an amine number of 73 and 80 of N.V. was obtained.

100 weight parts of the said resin composition (2-C) was neutralized with 5.0 parts of acetic acid further, 162 parts of the deionized water was added and thereby, an aqueous dispersion solution having 30 percent of N.V. was obtained.

The said aqueous dispersion solution, 19.5 parts of titanium white, 0.5 parts of carbon black, 0.8 parts of iron naphthenate having 5 percent of concentration and 2.0 parts of dibutyl-tin-dilaurate were treated with a dispersing procedure in a ball mill. Further, 733 parts of deionized water was added in the resulting dispersed liquid mixture and thus, the electrodeposition sample liquid having about 10 percent of N.V., about 5.9 of pH and an aqueous homogeneous dispersibility was obtaiend.

A steel plate treated with zinc phosphate was used as the cathode in the electrodeposition sample liquid and the electrodeposition step was carried out at 30° C. of temperature during two minutes with an electric current having 180 V of voltage.

After the baking step at 180° C. of temperature two minutes, the cured film having 18µ of thickness and superior smoothness by 3H of pencil hardness was obtained.

The properties of said film are set forth as follows:

| | |
|---|---|
| Impact resistance (⅛ inch × 1.0 kg × 50 cm) | : Admitted |
| Ericksen resistance | : more than 7 mm |
| Salt spray test in accordance with JIS-Z-2371 | None-corroded in 700 hours |

EXAMPLE 3

The sodium dispersed material was added in tetrahydrofuran containing dissolved 1,2-diphenylbenzene and a monomer mixture consisting of butadiene and styrene was added in the foregoing system kept at −60° C. of temperature and thereby an intermediate compound of living polymerization reaction was obtained. The said intermediate compound was treated with epichlorohydrin and thereby, a copolymer of butadiene-styrene having 1,100 of number average molecular weight, 2.3 percent of epoxy oxygen content rate, 70/30 of weight ratio of butadiene unit in proportion to the styrene unit and the epoxy group at the terminal of polymer chain was obtained. Then, the mixture consisting of 1,000 parts of the said copolymer, 135 parts of diethanol amine and 285 parts of cellosolve acetate was kept at 80° C. of temperature during one hour and then it was kept at 120° C. temperature for two hours and thus, the addition reaction compound of polybutadiene-amine (3-A) having an amine number of 64 was obtained.

On the other hand, the mixture consisting of 256 parts of Epikote-1001 (Trade Name for the product of Shell Chemical Co.), i.e. an epoxy resin by condensate of bisphenol A and epichlorohydrin, 27 parts of diethanol-amine and 71 parts of methyl isobutyl ketone was kept at 60° C. of temperature during 30 minutes and thus, the partial addition reaction compound of epoxy resin-amine (3-B) having an amine number of 50 was obtained.

1,420 parts of the addition reaction compound of polybutadiene-amine (3-A) obtained hereinbefore was mixed with 354 parts of the partial addition reaction compound of epoxy resin-amine (3-B) and the resulting mixture was kept at 60° C. temperature for one hour. Then, 760 parts of the partial block isocyanate compound (1-C) used in the Example 1 was added in the foregoing mixture and kept at a temperature of 60° C. for one hour and thus, the resin composition by the present invention (3-C) having amine number of 40 and 80 percent of N.V. was obtained.

125 parts of the said resin composition (3-C) was neutralized with 20 parts of butyl cellosolve and 5.1 parts of lactic acid and further 1.0 parts of manganese naphthenate having 5 percent of concentration and 2.0 parts of dibutyl-tin-dilaurate were added in the resulting resin composition and it was treated with a sufficient mixing step and then, was diluted by adding 850 parts of deionized water. Thus, the electrodeposition sample solution having about 10 percent of N.V., 5.6 of pH and an aqueous homogeneous dispersibility was prepared. The steel plate treated with iron phosphate was used as the cathode in the said elecrodeposition sample solution and the electrodeposition step was carried out at 30° C. of temperature during two minutes at a voltage of 150 V. After the baking step at a temperature of 170° C. for 30 minutes, the cured film having 22μ of thickness and superior smoothness was obtained. The properties of the said film are set forth as follows:

| | |
|---|---|
| Pencil hardness | 3 H |
| Impact resistance (½ inch × 1.0 kg × 50 cm) | Admitted |
| Salt spray test in accordance with JIS-Z-2371 | None-corroded in 500 hours. |

EXAMPLE 4

A copolymer [IV] consisting of butadiene and α-methyl styrene was obtained by the same process as described in Example 3. The said polymer [IV] contained epoxide groups on substantially each end of the polymer chain and had a number average molecular weight of 2050, epoxide content of 1.3% and α-methyl styrene content in the polymer of 40%.

A cationic polybutadiene resin (IV-A) was prepared by treating 1000 parts of the above copolymer [IV], 80 parts of diethylenetriamine and 270 parts of cellosolve acetate with the same manner as described in Example 3.

A partially cationic epoxy resin (IV-B) was prepared by dissolving 653 parts of polyglycidyl ether of bis-phenol-A [Epikote-1001; Shell Chemical Co.] in 181 parts of methyl ethyl ketone with agitation and heating. When cooled to 60° C., 66 parts of diethylamine was added to the mixture for 0.5 hours. The batch was then held an additional 0.5 hours at 60° C.

A partially-blocked 2.4-toluene diisocyanate (IV-C) was prepared by adding 188 parts of ε-caparolactam slowly to the 262 parts of 2.4-toluene diisocyanate and 112 parts of butyl-acetate over a period of 1 hour at 30° C. The batch was kept for an additional 2 hours at 60° C.

A self-crosslinking cationic polybutadiene resin (IV-D) was prepared by mixing 1350 parts of the above cationic polybutadiene (IV-A) and 900 parts of the above partially cationic epoxy resin (IV-B) for 1 hour at 60° C. 562 parts of the above partially blocked diisocyanate (IV-C) was added to the batch and held for 2 hours at 80° C. until all isocyanate groups were reacted.

The amine value of this final resin was 68 KOHmg/g.

100 parts of the above resin (IV-D) was neutralized with 4.0 parts of acetic acid, diluted with 96 parts of deionized water, grinded with 12.5 parts of iron oxide, 12.5 parts of titanum dioxide, 5.0 parts of talc, 0.7 parts of 5% iron naphthenate and 1.5 parts of dibutyl tin dilanrate and, finally, thinned with 768 parts of deionized water. This pigmented electrodeposition bath of approximately 10% solid displayed a PH 6.0 and after setting for one night, showed a fine particle dispersion of pigments.

When cathodically deposited upon an untreated cold-rolled steel panel for 2 minutes at 200 volts and cured 30 minutes at 180° C., this composition yielded a smooth film of 18μ of thickness and 3H pencil hardness. When mark and placed under salt spray condition for 300 hours, in accordance with JIS-Z-2371 the above film displayed little or no rust creepage at the mark.

EXAMPLE 5

A sodium dispersion was added to a solution of 1,2-diphenylbenzene in tetrahydrofuran and then butadiene was slowly added to the mixture at −60° C. The mixture was treated with water, whereby there was obtained a butadiene homopolymer. The polymer was treated with peroxide, for example peracetic acid, then there was obtained epoxidized butadiene homopolymer [V], (BF-1000; NIPPON SODA CO.) which contained epoxide groups at the intramolecular position of the polymer and had epoxide content of 8.0%, number average molecular weight of 1100 respectively.

A cationic polybutadiene resin (V-A) was prepared by mixing 1000 parts of the above polymer [V], 146 parts of diethanolamine and 288 parts of butyl cellosolve. The batch was held for 1 hour at 80° C. and additional 3 hours at 140° C.

A self-crosslinking cationic polybutadiene resin (V-B) was prepared by treating with 1434 parts of the above resin (V-A) and 1434 parts of the partially cationic epoxy resin which was prepared by the same process as described in Example 4 (IV-B) for 1 hour at 60° C. Then 1225 parts of the partially blocked diisocyanate which was prepared by the same process as described in Example 1 (1-C) was added and the batch was held for 2 hour at 80° C. and diluted with 577 parts of butyl cellosolve.

This resin showed 55 KOHmg/gr. of amine value and 70% non-volatile content.

143 parts of the above resin (V-B) was neutralized with 4.7 parts of acetic acid, blended 1.0 parts of 5% iron naphthenate and 1.0 parts of lead acetate, and diluted with 850 parts of deionized water.

The resultant resin dispersion of approximately 10% non-volatile content and a PH 5.9 was electrodeposited on a zinc phosphate steel cathode for 2 minutes at 190 volts, yielding a smooth film of 20 microns thickness after curing 30 minutes at 180° C.

The other film properties were as follows.

| Pencil hardness | 3 H |
|---|---|
| Impact resistance (Pu-pont) ($\frac{1}{2}$in. × 1 kg × 50 cm) | No failure |
| Salt spray resistance | 750 Hrs. little or no rust creepage at the scribe. |

EXAMPLE 6

The butadiene homopolymer which was prepared by the same process as described in Example 1 [I] was treated with peroxide, for example peracetic acid, there was obtained epoxidized butadiene homopolymer [IV], which contained epoxide groups on substantially each end of the polymer chain and at the intramolecular position of the polymer respectively. The epoxide butadiene polymer had number average molecular weight of 1250 and epoxide content of 6.0%.

A cationic polybutadiene resin (VI-A) was prepared by reacting 1000 parts of the above polymer (VI), 150 parts of diethylamine and 288 parts of cellosolve acetate at 60° C. for 1 hour and then for 3 hours at 120° C.

A partially cationic phenol modified epoxy resin (VI-B) was prepared by first dissolving 475 parts of polyglycidyl ether of bisphenol A [Epikote 828], 237 parts of resol type phenol resin [PP-3007; GUNEI Chemical Ind. Co.] and 192 parts of butyl cellusolve with agitation and heating. When in solution and cooled to 60° C., 54 parts of diethylamine were added for 0.5 hours and the batch held 0.5 hours at 60° C.

A partially blocked hexamethylene diisocyanate (VI-C) was prepared by adding 191 parts of n-butanol slowly to the solution of 288 parts of hexamethylene diisocyanate and 120 parts of ethyl acetate over a period of 1 hour at 30° C. The batch was then mixed an additional 2 hours at 60° C.

A self-crosslinking cationic polybutadiene resin (IV-D) was prepared by treating with 1438 parts of the above cationic polybutadiene resin (VI-A) and 958 parts of the above partially cationic phenol modified epoxy resin (VI-B) for 1 hour at 60° C. Then 599 parts of the above partially blocked-isocyanate (VI-C) was added and the batch was held for 2 hours at 80° C. and diluted with 430 parts of ethyl cellsolve. The final resin (VI-D) had an amine value of 65 KOHmg/g and 70% non-volatile content. 100 parts of the above resin (VI-D) was neutralized with 5.8 parts of lactic acid and pigmented by the same process as described in example-4. The final electrodeposition bath of approximately 10% solid displayed a pH of 5.7 and showed a fine particle dispersion of pigments.

When cathodically deposited on a ironphosphated steel panel for 2 minutes at 150 wolts and cured for 30 minutes at 180° C., this composition yielded a smooth film of 22 microns thickness. The additional film properties were as follows.

| pencil hardness | 2 H ~ 3 H |
|---|---|
| Impact resistance (Du pont) ($\frac{1}{2}$in. × 1 kg × 50 cm) | no failure |
| Salt spray resistance (JIS-Z-2371) | 500 Hrs. little or no rust creepage at the scribe. |

EXAMPLE 7

A partially cationic epoxy resin (VII-A) was prepared by heating 227 parts of an additional product of ethyleneoxide and bisphenol A, and 439 parts of polyglycidyl ether of bis phenol A [Epikote 828] for 3 hours at 150° C. When cooled to 60° C., 177 parts of methyl ethyl ketone and 42 parts of idethylamine were added to the batch for 0.5 hours and additionally held 0.5 hours at 60° C.

A self-crosslinking cationic polybutadiene resin (VII-B) was prepared by treating 885 parts of the above resin (VII-A) and 1325 parts of the cationic polybutadiene resin which was prepared by the same process as described in Example 2 (II-A) for 1 hour at 60° C. 552 parts of the partially blocked diisocyanate which was treated by the same process as described in Example 1 (I-C) was added and the batch was held for 2 hours at 80° C. and diluted with 398 parts of butyl cellosolve. The resin had an amine value of 60 KOHmg/g.

143 parts of the above resin (VII-B) was neutralized with 5.1 parts of acetic acid, blended 1.0 parts of 5% iron naphthenate and 2.0 parts of dibutyl tin dilaurate, and thinned with 850 parts of deionized water. The resultant electrodeposition bath showed a PH 5.5 and approprimately 10% solid content. Zinc phosphated steel panel was cathodically coated for 2 minutes at 180 volts and cured 30 minutes at 180° C. to yield a smooth hard film of 22 microns thickness. The other film properties were as follows.

| Pencil hardness | : | 3 H |
|---|---|---|
| Impact resistance (Du pont) ($\frac{1}{2}$ in. × 1 kg × 50 cm) | : | no failure |
| Salt spray resistance (JIS-Z-2371) | : | 600 Hrs, little or no rust creepage at the scribe. |

EXAMPLE 8

A ketominized diethylenetriamine (VIII-A) was prepared by reacting 95 parts of diethylentriamine and 185 parts of methyl isobutyl ketone under refluxing for about 4 hours to remove water by use of a decanting trap in the distillate return line.

A cationic polybutadiene resin (VIII-B) was obtained as follows; 1000 parts of butadiene/α-methylestyrene co-polymer, which was prepared by the same manner as described in Example 4 [IV] and contained epoxide groups on substantially each end of the polymer chain, 247 parts of the above ketiminized diethylene triamine (VIII-A) and 311 parts of cellosolve acetate were mixed, held for 1 hour at 60° C. and for for 2 hours at 100° C.

A partially cationic epoxy resin (VIII-C) was prepared as follows; 384 parts of novolak type epoxy resin [Epikote-154; Shell chemicals Co.] was dissolved in 115 parts of methyle ethyl ketone by agitation and heating. When cooled to 60° C., 80 parts of diethylamine was added to the batch for 0.5 hours and held additional 0.5 hours at 60° C.

A self-crosslinking cationic polybutadiene resin (VIII-D) was prepared as follows;

1558 parts of resin (VIII-B) and 579 parts of the resin (VIII-C) were mixed and held for 1 hour at 60° C. Then 482 parts of the partially blocked diisocyanate which was produced in the same manner as described in Example 1 (I-C) was added and held for 2 hours at 80° C. The resultant resin (VIII-D) had amine value of 95 KOHmg/gr.

143 parts of the above resin (VIII-D) was neutralized with 7.5 parts of acetic acid, blended 1.0 parts of iron naphthenate, and diluted with 850 parts of deionized water to approximately 10% non-volatile content. This dispersion of a PH 5.9 was electrodeposited on a iron-phosphated steel cathode for 2 minutes at 190 volts, yielding a smooth film of 20 microns thickness after curing 30 minutes at 175° C.

The additional film properties as follows.

| Pencil hardness | : 3 H |
|---|---|
| Impact resistance (Du pont) (½ in. × 1 kg × 50 cim.) | : no failure |
| Salt spray resistance (JIS-Z-2371) | : 450 Hrs. little or no rust creepage at the scribe. |

COMPARATIVE EXAMPLE 1

A cationic epoxy resin (R-I) was prepared by first dissolving 500 parts of polyglycidyl ether of bisphenol A [Epikote 1001; Shell chemicals Co.] in 190 parts of methyl isobutyl ketone with agitation and heat. When in solution and cooled to 60° C., 70 parts of diethylamine were added and the batch heated to 80° C. for 2 hours.

A self-crosslinking cationic epoxy resin (R-2) was prepared by mixing 760 parts of the above resin (R-1) and 507 parts of the partially blocked diisocyanate which was produced in the same manner as described in Example 1 (I-C), and held for 2 hours at 80° C. until all isocyanate groups were reacted. The final resin (R-2) had amine value of 55 KOHmg/gr.

107 parts of the above resin (R-2) was neutralized with 4.0 parts of acetic acid, blended with 2.0 parts of dibutyl tin dilaurate and diluted to 40% non-volatile content with 87 parts of deionized water. The gray finish composite was then prepared by grinding 19.5 parts of titanium dioxide, 0.5 parts of carbon black and 200 parts of the above neutralized resin. The mixture was diluted with 780 parts of deionized water The finish composite batch showed a PH 5.5 and approximately 10% solid content.

After setting the batch for one night, there were observed a large amount resinous precipitate at the bottom of the batch and water-insoluble floating matter above the batch.

After re-dispersion of this batch by a homogenizer, the resultant composition was electrodeposited on a zinc-phosphated steel cathode for 2 minutes at 160 volts and cured for 30 minutes at 185° C. The film had 18 microns thickness and 3 H pencil hardness. When marked and tested for salt spray resistance for 400 hours in accordance with JIS-Z-2371, the film displayed little or no rust creepage at the mark.

The film appearance was not smooth and showed considerably orange peeling or pitting. Impact resistance of the film was also inferior. When tested with 20 cm height, 1 kg weight and ½ inch diameter, the film showed several cracks or failure.

COMPARATIVE EXAMPLE 2

A linseed fatty acid modified cationic epoxy resin (R-3) was prepared as follows;

760 parts of the cationic epoxy resin, which was prepared in the same manner as described in Comparative Example 1 (R-1), 110 parts of methyl isobutyl ketone and 300 parts of linseed fatty acid was mixed and slowly heated to 200° C. under nitrogen atmosphere. Under refluxing condition and removing water by use of a decanting trap, the batch was kept until the acid value decreaced below 10 KOHmg/gr.

A self-crosslinking oil modified cationic epoxy resin (R-4) was prepared by mixing 800 parts of the above resin (R-3), having 71% non-volatile content, and 273 parts of the partially blocked diisocyanate which prepared in the same manner as described in Example 1 (I-C). The batch was held for 2 hours at 80° C., and diluted with 196 parts of butyl cellosolve.

The amine value of this resin was 50 KOHmg/gr.

143 parts of the above resin (R-4) was neutralized with 4.6 parts of acetic acid, blend with 2.0 parts dibutyl tin dilaurate and diluted 850 parts of deionized water.

This dispersion batch showed a pH 5.2 and approximately 10% solid content. A zinc phosphated steel panel was cathodically electrodeposited for 2 minutes at 120 volts and cured 30 minutes at 190° C. to yield a cured film of 22 micron thickness and H pencil hardness.

The film appearance was not smooth and showed a little orange peeling or pitting. Under test conditions of 50 cm height with 1 kg weight and ½ in., impact resistant of the film was passed. But the film failed at the salt spray test in accordance with JIS-Z-2371 for 96 hours.

The foregoing results clearly showed that the cathodically electrodepositable composites obtained from this invention were superior to the composites obtained from the customary technique which mainly consisted of urethane modified polyglycidyl ether of bisphenol A and did not contain a polybutadiene element, especially in paint of pigment dispersibility bathstability, film apperance and physical properties of films.

We claim:

1. A cathodic sediment type of electrodeposition paint composition which comprises using as a main component an addition material made of a butadiene polymer having an epoxy group and an amino compound as a first component and an addition material of epoxy resin or a modified epoxy resin and an amino compound as a second component, wherein, said butadiene polymer having an epoxy group consists of material selected from the group consisting of:

(A) a butadiene homopolymer having an epoxy group at the terminal of the polymer chain, or a butadiene copolymer consisting of 30 to 100 weight percent of butadiene as a constituent of the polymer chain and 70 to zero weight percent of α-methyl styrene or styrene, (B) a derivative of a butadiene polymer having an epoxy group at the terminal part or the intramolecular part of the polymer chain obtained by treating the aforementioned butadiene homopolymer or butadiene copolymer with an organic peroxide, and, (C) a butadiene polymer having an epoxy group at the intramolecular part of the polymer chain produced by treating the aforementioned butadiene homopolymer or copolymer by a polymerization process with an organic peroxide; said amino compound used in both said first and second components consists of material selected from the group consisting of mono- or di-alkylamines, including propylamine, butyle amine, diethyl amine, dipropylamine, alkanol amines including ethanol amine, diethanol amine, dipropanol amine, mono or polyalkylene polyamines including ethylene diamine, propylene diamine, hexamethylene diamine, diethylene triamine, triethylene tetramine N-amino ethanol amine and diethyl aminopropyl amine; and, the modified epoxy resin consisting of the aforementioned epoxy resins reacted with a cresol, novolak type of resin, or a bisphenol type, and an alkylene oxide having 1 to 4 carbon atoms with an an addition reaction step; said first and second components being homogeneously chemically bonded by using about 99% to about 20% of the first component to about 1% to about 80% by weight of the second component, the amino compound having from about 50% to 95% by weight of amine equivalent in proportion to the equivalent epoxy group.

2. The said cathodic sediment type of paint composition, according to the claim 1 which comprises using the said butadiene polymer having the epoxy group at the terminal of polymer chain.

3. The said cathodic sediment type of paint composition, according to the claim 1 which comprises using the said butadiene polymer having the epoxygroup at the intramolecular position and at the terminal of polymer chain.

4. The said cathodic sediment type of paint composition, according to the claim 1 which comprises selecting the said epoxy resin from a bisphenol type of epoxy resin.

5. The said cathodic sediment type of paint composition, according to the claim 1 which comprises selecting the said epoxy resin from a novolak type of epoxy resin.

6. The said cathodic sediment type of paint composition, according to the claim 1 which comprises selecting the said denatured epoxy resin from an epoxy resin modified with a phenol resin.

7. The said cathodic sediment type of paint composition, according to the claim 6 which comprises selecting the said phenol resin from a resol type phenol resin.

8. The said cathodic sediment type of paint comppsition, according to the claim 1 which comprises selcting the said modified epoxy resin from an addition material of the said epoxy resin-bisphenol A or an addition material of the said epoxy resin-alkleneoxide having 2 to 6 carbon atoms.

9. The said cathodic sedement type of paint composition, according to the claim 1 which comprises using a block isocyanate compound as a auxiliary first component besides the said second component [I] and the said component [II].

10. The said cathodic sediment type of paint composition, according to the claim 1 which comprises using an accelerating catalyst of dissociating an urethane bond and another accelerating catalyst of oxidizing, curing an unsaturated bond besides the said first component [I] and the said component [II].

11. The said cathodic sediment type of paint composition, according to the claim 10 which comprises selecting the said accelerating catalyst of oxidizing, curing the unsaturated bond from an oleo-soluble, organic acid salt(s) of transition metal(s) in the group of iron, manganese, vanadium and titanium as a single catalyst alone or these mixtures thereof.

12. A cathodic sediment type of electrodeposition paint composition which comprises an aqueous medium, a resinous binder dissolved or dispersed therein and an accelerating catalyst, said resinous binder being an acid neutralized reaction mixture of a first component (I) and a second component (II) in a weight ratio of 99 to 20 parts of the first component to from 1 to 80 parts of the second component, wherein the first component is an addition material of a polybutadiene terminating in an epoxy group and a primary or secondary amino compound, and, the second component is an addition material of an epoxy resin and a primary or secondary amino compound, and said accelerating catalyst is selected from the group consisting of an oleo-soluble organic acid salt of a transition metal said metal in turn being selected from the group consisting of iron, manganese, vanadium and titanium.

13. A paint composition as claimed in claim 12 wherein said epoxy resin is a bisphenol type of epoxy resin.

14. A paint composition as claimed in claim 12 wherein said epoxy resin is a novolak type epoxy resin.

15. A paint composition as claimed in claim 12 wherein in addition to said first and second components (I, II) a blocked isocyanate compound is used as an auxiliary component.

16. A paint composition as claimed in claim 12 which comprises using an accelerating catalyst for dissociating a urethane bond and another accelerating catalyst for oxidizing, curing an unsaturated bond in addition to said first and second components.

17. A paint composition as claimed in claim 16 wherein said accelerating catalyst for oxidizing, curing the unsaturated bond is selected from the group consisting of an oleo-soluble, organic acid salt of transition metal consisting of iron, maganese, vanadium, titanium and mixtures thereof.

* * * * *